INVENTOR
PETRUS ROBERT DeRYCK

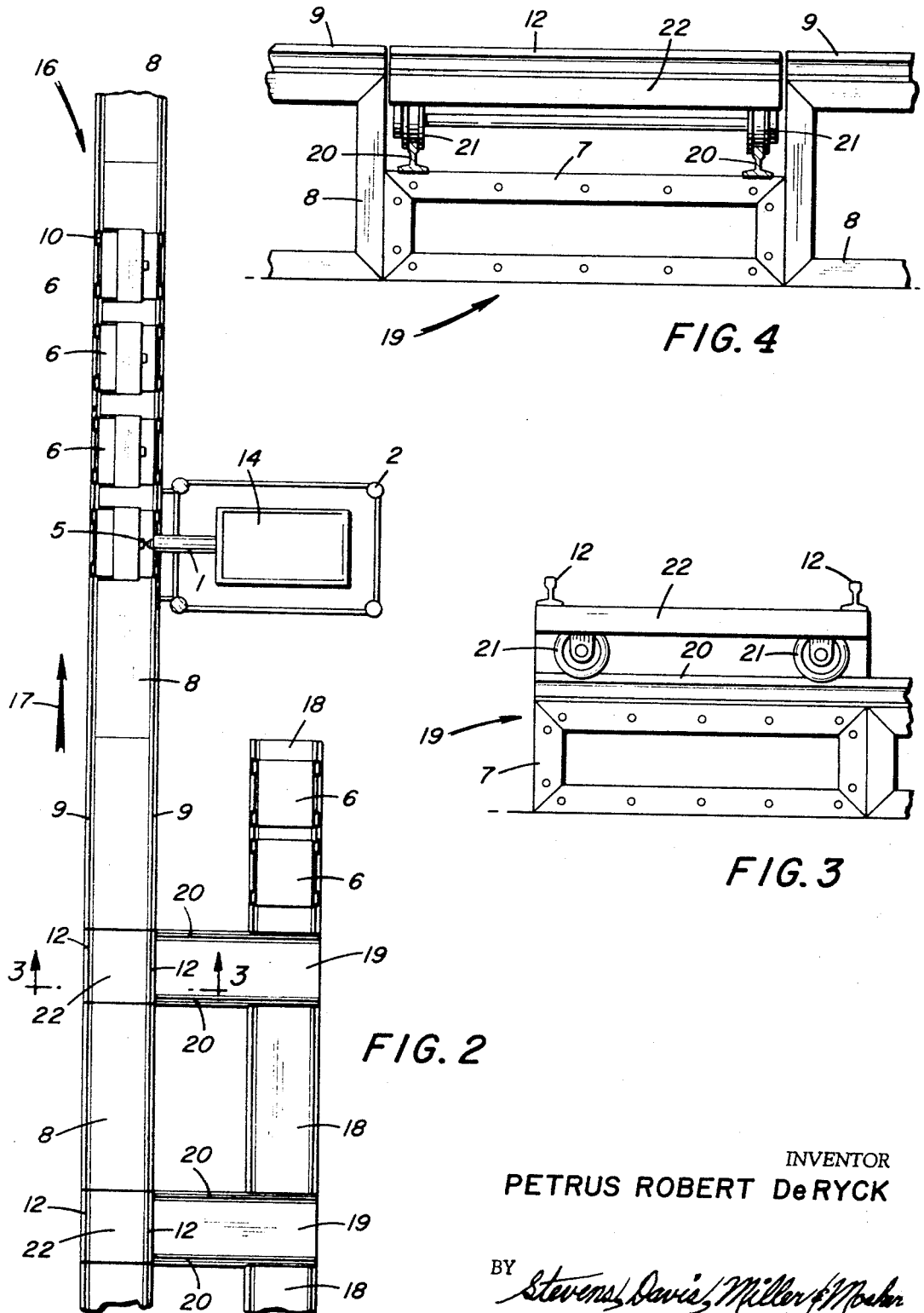

United States Patent Office 3,448,490
Patented June 10, 1969

3,448,490
INSTALLATION FOR THE INJECTION OF A SOLE IN A MOULD CLOSED BY A LAST
Petrus Robert De Ryck, Oordegem, Belgium, assignor to Constructiewerkhuizen Van Oordegem, Oordegem, Belgium, a Belgian company
Filed July 6, 1966, Ser. No. 563,121
Claims priority, application Belgium, July 7, 1965, 666,536
Int. Cl. B29f 1/10; B29d 31/00
U.S. Cl. 18—4                                     1 Claim

ABSTRACT OF THE DISCLOSURE

An injection molding installation having an injection head, a series of molds, and means to impart intermittent movement to the molds. The molds are carried by trolleys which move along rails sequentially into and out of the molding position. The installation includes means for replacing and rearranging the order of the trolleys.

---

This invention relates to an installation for the manufacture of molded articles, in particular the injection of a sole on a shoe placed on a last in a mold.

The installation according to the invention allows the manufacture of a large number of shoes in succession, without requiring time for cooling and without the physical and chemical action of the injected material having any influence on the production.

For that purpose the installation according to the invention comprises an injection head, a series of molds, means imparting an intermittent movement to the molds, so that each mold is sequentially located in front of the injection head and means actuating an injection mechanism which is connected to the injection head every time a mold is placed in front of the injection head. The molds are carried by individual trolleys which run on rails and which may be switched from a main track to an alternate track to effect repairs, changes of molds, etc. The track generally forms an H shape with a main, an alternate and an intermediate connecting track.

In an advantageous embodiment of the invention, means are provided to impart a reciprocal motion to the injection head along the axis thereof and said means are coupled with the means imparting an intermittent movement to the molds.

Examples of suitable injecting spouts and molds may be noted from Belgian Patents 634,196, 649,276 and 645,672.

Other features and advantages of the invention will become apparent from the description given hereinafter of an installation for the injection of a sole on a shoe placed on a last closing a mold, according to the invention; this description being given by way of example with reference to the accompanying drawings in which:

FIGURE 2 is a diagrammatic plan view of the installation according to FIGURE 1;

FIGURE 3 is an end view of an element belonging to an installation according to FIGURE 1 and taken along line 3—3 of FIGURE 1; and FIGURE 4 is a side view of the element shown in FIG. 3.

In the different figures the same reference numerals refer to the same elements.

Figure 1:
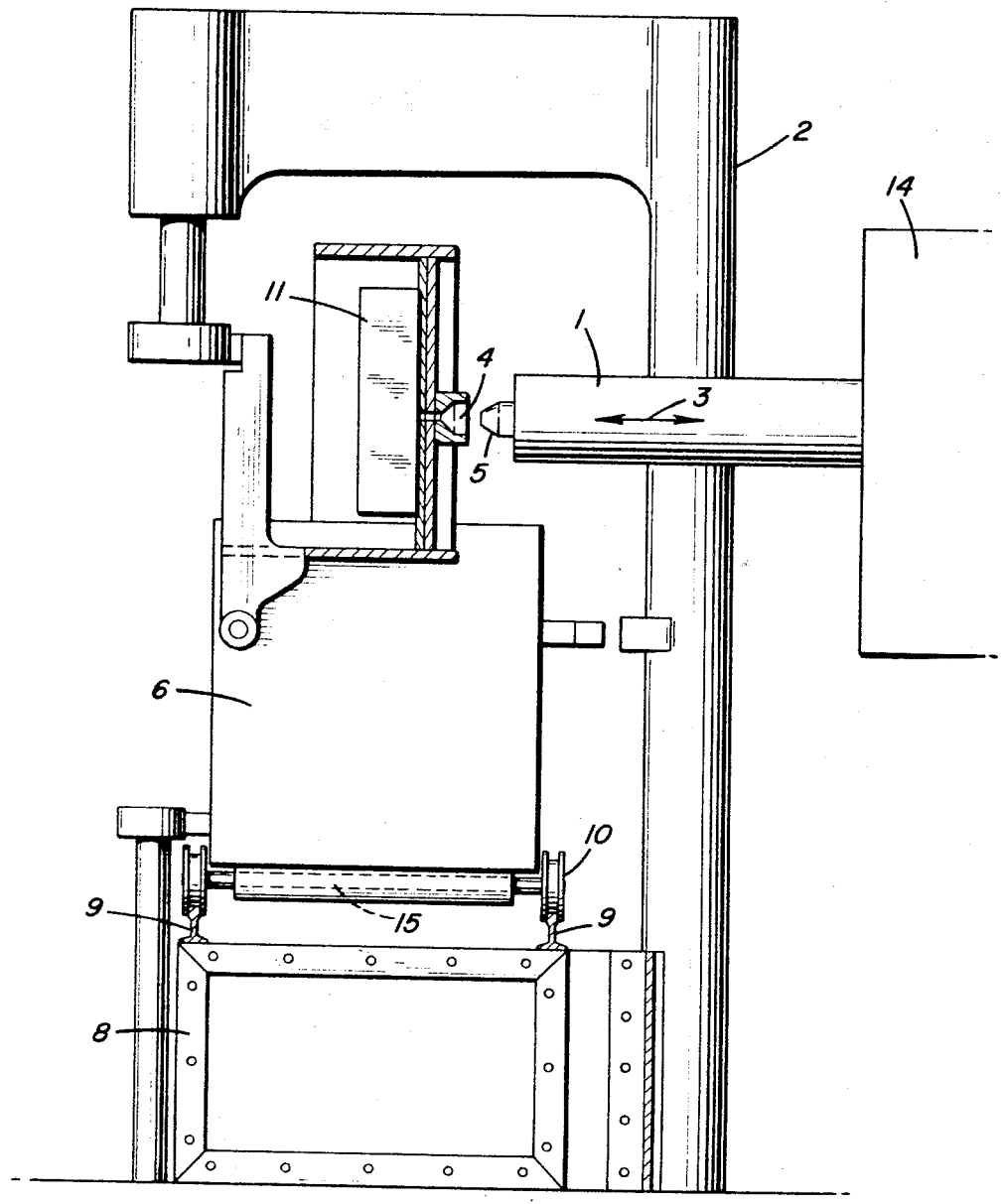
FIGURE 1 is an end view, partly diagrammatic and partially sectional, of part of an installation for the injection of a shoe sole.

The installation shown in the drawings comprises an injection head 1 mounted on a frame 2 and connected to the injection mechanism 14. A reciprocal movement is imparted to the injection head in the direction shown by the arrows 3. The injection head 1 is provided with an injection spout 5, which forms the actual injection nozzle. The injection spout cooperates, in a manner known per se, with the connection component 4 on the mold.

The molds and the lasts cooperating therewith are mounted on trolleys 6 by pivot arms carrying the lasts with reference to the actual frame carrying the molds. The trolleys 6 are provided with axles 15 and flanged wheels 10. The wheels 10 run on rails 9 making up the main track 16.

The trolleys on the main track 16 are provided with an intermittent movement in the direction of an arrow 17 (see FIG. 2). By this means each trolley sequentially advances in front of the injection head 1 so that each mold stops separately in front of the injection head. At that moment the last closes the mold on the side opposite to the injection head, so that the material injected in the mold by the injection mechanism 14, through the injection head 1, forms a sole. Of course, a shoe will have first been mounted on the last. After a mold provided with a last runs past the injection head in the direction of the arrow 17, the injected material has sufficient time to cool and to react chemically and physically prior to the withdrawal of the last from the mold and prior to the removal of the shoe with its integral sole.

The cooling time therefore does not influence the operation of the injection mechanism, considering that a plurality of molds stop successively one after another in front of the injection head 1. When all the trolleys, with the molds mounted thereon, have run past the injection head 1, a movement in the opposite direction to that arrow 17 is imparted to the whole train of trolleys. A new shoe body to be provided with a sole, is mounted on each last. The lasts are again secured on the molds and the intermittent movement of the trolleys, carrying the molds with the lasts can start again in the direction of arrow 17. The injection mechanism, the means imparting to the injection head a reciprocal movement in the direction of the arrows 3 and the means which, in the manner described hereinbelow, start the running of the trolleys provided with their lasts are inter-connected; those means are moreover also connected to the mechanisms securing the lasts on the molds and removing the lasts from the molds. As mentioned hereinbefore, the main track 16 is made up of rails 9. Said rails 9 are secured to the top part of elements built up from angles assembled in accordance with the edges of a straight and right angle parallelepipedon. A front view of such an element 8 is shown in FIGURE 1 and a side view is shown in FIGURE 4.

The length of the elements 8 in the longitudinal direction of the track 16 is about 3 meters. The different elements 8 are connected together so as to form a complete assembly. On the elements 8 are mounted the mechanisms for stopping and starting the trolleys and opening and closing the molds.

The number of elements 8 determines the length of the track 16. All that is therefore needed to extend a track is to add one or more elements 8 thereto.

Means are also provided to enable the trolleys to be removed from the main track 16, for the purpose of repairs or for other reasons, and to transfer them to another track 18.

For that purpose, tracks 16 and 18 are connected to subsidiary tracks 19. Each subsidiary track 19 comprises, as shown principally in FIGURE 4, elements 7 intercalated between the elements 8. The elements 7 are provided with rails 20 at right angles to the rails 9 of the tracks 16 and 18. On these rails 20 run, by means of their flanged wheels 21, trolleys 22 carrying rails 12. The rails 12 are parallel to the rails 9 and are, in fact, pieces of rails provided between the rail 9 of adjacent elements 8 belonging to the tracks 16 and 18. When a trolley 6 has to be removed from the track 16 for repairs, it is moved on to the rails 12 of a trolley 22. The trolley 22 is then moved, by means of its wheels 21, on the rails 20 until the rails 12 are located between the rails 9 of the elements 8 of the track 18. When the trolley 6 has cleared the rails 12, the trolley 22 is moved back until the rails 12 again complete track 16, so that the installation can continue to operate in a normal manner. When the trolley 22 is located in the track 16 or in the track 18 it is locked in position; the trolleys therefore only run on the subsidiary track 19 when a trolley 6 has to be removed for or is taken back after repairs.

The trolleys 6 may also be transferred to the track 18 in order to alter the order of sequence of the trolleys or to secure other molds on the trolleys without having to stop the process of production.

The connection between the different mechanisms and the mechanisms themselves may be carried out by various means. The motion of the injection head 1, for example, may be accomplished by means of a hydraulic pump. The motion of the trolleys 6 is determined, for preference, by the motion of the injection head; the different trolleys move independently the ones from the others.

The invention is in no way limited to the form of embodiment described hereinbefore and within the scope of the present patent application many changes may be made to the form of embodiment described, particularly with reference to the shape, composition, disposition and number of elements used to implement the invention.

I claim:

1. In an installation for manufacturing molded articles, in particular for the injection of soles on shoes placed on lasts in molds, comprising a plurality of trolleys having said molds mounted thereon, a main track for the trolleys, said main track being formed from at least two fixed parallel rails and supporting means, a second track parallel to and structural similar to the main track, and a subsidiary track comprising a pair of rails at a right angle to the rails of the main and second tracks, an auxiliary trolley mounted on said pair of rails and having thereon at least two rails parallel to those of the main and second tracks whereby said auxiliary trolley may be selectively positioned so that its rails form a continuation of said main and second tracks.

References Cited

UNITED STATES PATENTS

| | | |
|---|---|---|
| 2,732,584 | 1/1956 | Bishop. |
| 2,775,787 | 1/1957 | Krag. |
| 2,892,214 | 6/1959 | McCarthy. |
| 3,203,042 | 8/1965 | Axelsson. |
| 3,266,086 | 8/1966 | Markevitch. |

WILBUR L. McBAY, *Primary Examiner.*

U.S. Cl. X.R.

18—30